United States Patent [19]

Uhland

[11] Patent Number: 4,531,187

[45] Date of Patent: Jul. 23, 1985

[54] GAME MONITORING APPARATUS

[76] Inventor: Joseph C. Uhland, 1020 Kresson Rd., Cherry Hill, N.J. 08003

[21] Appl. No.: 435,776

[22] Filed: Oct. 21, 1982

[51] Int. Cl.[3] .......... G06F 15/28

[52] U.S. Cl. .......... 364/412

[58] Field of Search .......... 364/410, 411, 412; 434/129; 358/108; 194/79 A; 273/138 A

[56] References Cited

U.S. PATENT DOCUMENTS

| | | | |
|---|---|---|---|
| 3,921,003 | 11/1975 | Greene | 194/97 A |
| 4,072,930 | 2/1978 | Lucero et al. | 364/412 |
| 4,108,361 | 8/1978 | Krause | 364/412 |
| 4,120,004 | 10/1978 | Coutta | 358/108 |
| 4,283,709 | 8/1981 | Lucero et al. | 364/410 |
| 4,339,798 | 7/1982 | Hedges et al. | 364/412 |
| 4,357,015 | 11/1982 | Santora et al. | 358/108 |

*Primary Examiner*—Jerry Smith

*Assistant Examiner*—Allen MacDonald

*Attorney, Agent, or Firm*—Woodcock, Washburn, Kurtz, Mackiewicz & Norris

[57] ABSTRACT

A system for monitoring the play at gambling games is disclosed. The preferred embodiment comprises a system for monitoring the play at blackjack as that game is played in casinos. The system typically will comprise video monitor means for generating a digital representation of the bets made by the players and of the cards dealt to the players and to the dealer, so that an output can be generated indicating whether the correct payouts are made and bets collected. An alarm signal is generated if an error is made in the play of the game. An alarm signal may also be generated if the long-term statistics of the game indicate that the odds ordinarily applicable to the game have been departed from over a period of time.

9 Claims, 4 Drawing Figures

GAME MONITORING APPARATUS

FIELD OF THE INVENTION

This invention relates to apparatus for monitoring the play at gambling games so as to ensure that the rules of the game are being followed. More particularly, the invention relates to apparatus for monitoring the play at Blackjack as practiced in casinos.

BACKGROUND OF THE INVENTION

It is well known that in recent years casinos for the play of legalized gambling games, including card games, have become increasingly common. One of the most popular of these games is blackjack, on which enormous sums are wagered daily in casinos. Blackjack is a relatively simple game in which each player including the dealer is dealt two or more cards, the object being to take additional cards as necessary until the sum of the cards is 21 or less. However, the play is complicated by the typical casino arrangement for gambling at blackjack, which requires up to seven players be dealt to by a single dealer. Moreover, there are various possibilities for complex betting arrangements and for modification of the play which render the dealer's task relatively complex with increasing chance of dealer error. Obviously, as the dealer's shift progresses he or she is likely to grow increasingly tired and make further errors.

For all those reasons, it is desirable that apparatus be available for monitoring the play at blackjack and for alerting the dealer if he or she has made an error, for example. It is also desirable that the casino have a means to ensure that no opportunity for cheating of the casino exists, e.g., by collusion between a dealer and a player.

Another factor of relevance is that "card counters" have become increasingly prevalent is casinos. Card counters are persons who follow the play so as to know whether the cards remaining in the deck or decks from which the dealer is dealing include a greater or lesser number of high or low cards, which would alter the odds of any given card being drawn, and hence altering the strategy of play. It is well understood that such card counters can have a significant advantage over the casino. However, most dealers are unable to carry out their ordinary functions of dealing, monitoring the play of the individual cards, and perform the card counting function as well, so that they are unable to determine when a card counter would have an advantage and cannot be expected to know when the casino's interests would best be served by discarding the deck(s) and starting with fresh cards. Accordingly, it is desirable that an automatic apparatus be available to determine whether a particularly high number of high or low cards have been played in any given sequence so as to determine whether an opportunity for successful card counting exists.

From the above, it will be apparent that there exists a need for apparatus for monitoring the play of gambling games, particularly blackjack.

Such an apparatus to be successful would desirably have the following additional attributes. It would be useful without requiring any input from the dealer so as not to further complicate his work or task. It would operate entirely automatically without operator intervention and without modification to the complex rules and customs of the game as previously practiced. It would desirably provide a printed report on the play of the game. Finally, it would sound an alarm if any of the conditions mentioned above as desirable for detection occurred, e.g., cheating of or by a dealer, error of a dealer, or the existence of conditions which would favor card counters.

OBJECTS OF THE INVENTION

Accordingly, it is an object of the invention to provide apparatus for automatically monitoring the play of cards at blackjack and other casino games.

Another object of the invention is to provide an apparatus for monitoring the play of card games such as casino-style blackjack which may readily be installed without modification to the rules and customs of the game monitored, but which is capable of monitoring all facets of the play and of the betting taking place at the gaming table.

Another object of the invention is to provide apparatus for monitoring the play of and the betting on a card gambling game such as blackjack and of detecting errors in bet pay outs, or violation of game rules, both as to the play and as to the betting.

A further object of the invention is to provide an apparatus for monitoring the play of card games such as blackjack which generates a printed report showing trends in the play, errors made, profits earned and the like.

A final object of the invention is to provide means for monitoring a card-type gambling game capable of providing an alarm signal when conditions exist for advantage by persons counting cards and the like.

SUMMARY OF THE INVENTION

The above needs of the art and objects of the invention are satisfied by the present invention which comprises a system for monitoring the play of cards and bets made on card games such as blackjack. The system of the invention comprises means for optically monitoring the cards played and chips bet. This may comprise a video monitor, a scanner for conversion of the video image into a numeric representation of the cards and chips of each player and of the dealer's cards. Given this information, the system calculates the correct outcome of each hand. The system can then determine whether the dealer has made the correct payout or collected the correct amount, and can keep running totals of the play. The system can furthermore keep track of the cards which have been played so as to determine whether an opportunity for potentially successful card counting exists, and can generate an alarm signal in the event that it is desirable that new decks of cards be supplied to the dealer. In a preferred embodiment, the system of the invention is able to monitor plural playing tables, and the overall results are sent to a central computing unit which generates reports and statistics of the day's play. Each table would desirably be provided with its own microprocessor means and means for generating the signals concerning that table's play, for processing by the central computer.

BRIEF DESCRIPTION OF THE DRAWINGS

The invention will be better understood if reference is made to the accompanying drawings, in which.

DESCRIPTION OF THE PREFERRED EMBODIMENT

Certain aspects of the game of blackjack as presently played in casinos, notably those in Atlantic City, New Jersey, are relevant to the preferred embodiment of this invention. For example, the rules of the Atlantic City casinos require that the cards be dealt face-up and that the player not touch the cards. These facts are important because they enable an ordinary video camera mounted on the ceiling to "look" directly down upon the playing table surface so as to "see" the cards directly. In games where there is a strategy involved in the sequence of revealing the value of the cards dealt to a player, more elaborated monitoring means, e.g., markings on the backs of the cards invisible to the players but detectable by the camera, might have to be adopted. In the game of blackjack there is no strategy of this type. The casino rules also require that the player not touch the cards and that they be deposited by the dealer in specified locations on the table. This can be used to correlate the cards dealt to a specific location with the particular player. Similarly, the player's bets, represented by multicolored "chips", are also placed in specified locations on the table according to the rules. The number and color of the chips can be determined by the video camera and scanner, and the amount of the bet can accordingly be calculated by the associated computer, so as to determine whether the correct pay-outs are made and also to keep a running total of the number of chips collected by a given dealer.

Figure 1:
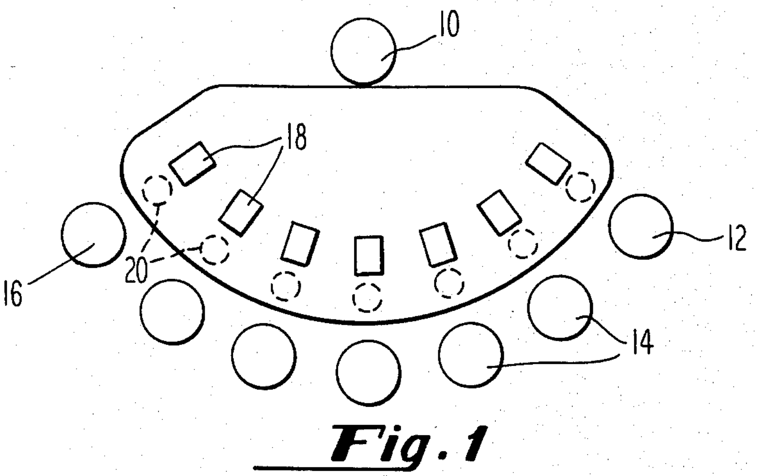
FIG. 1 shows a diagram of the playing table.

FIG. 1 shows the layout of a typical blackjack table, seen from above. The dealer sits at a position 10 facing players arranged from his left at 12 through a number of intermediary positions, typically not more than seven, to a right-most position 16. The table is marked with square areas 18 into which the cards are dealt; areas 20 are also provided in which the players deposit their bets. It will be appreciated that if one knows the cards which are dealt and the bets which are made, one can evaluate the proper outcome of the deal without ambiguity. There are no questions of strategy or of alternatives of play in blackjack which are not apparent from the position of the cards and the bets made. Therefore, both the chips and the card values are directly observable from above, so that a single video camera in the ceiling of the room in which the play takes place is adequate to monitor the play.

Figure 2:
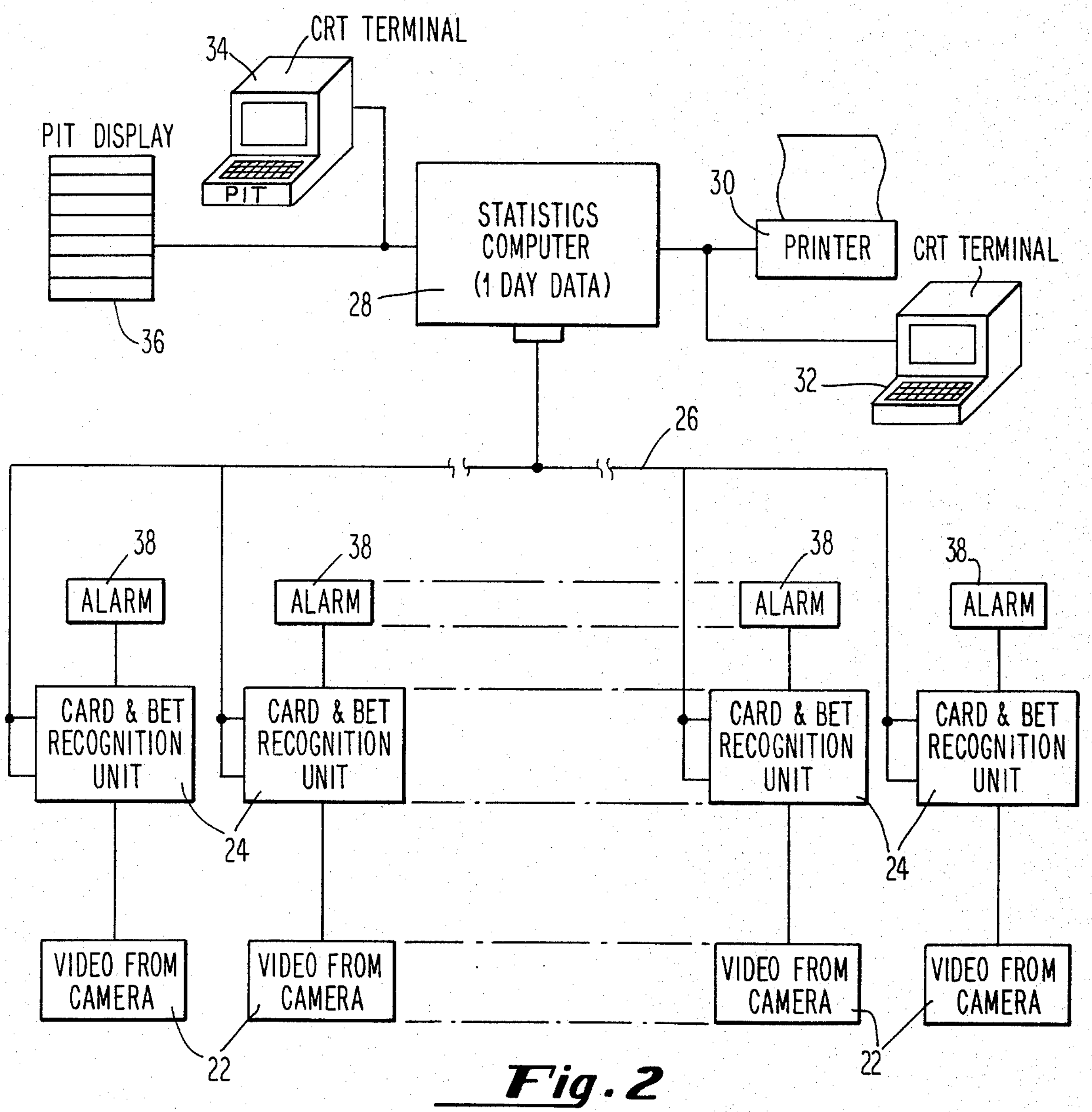
FIG. 2 shows a system overview.

FIG. 2 shows a currently envisioned embodiment of a system for monitoring a plurality of tables. Each table is provided with its own camera, the output of which, 22, is connected to individual card and bet recognition units 24. These generate outputs with respect to each table, which are fed over bus line 26 to a central computer 28 which records the statistics of a day's play, for example. Computer 28 may be enabled to output a report on a printer 30 and provide a running display on a CRT terminal 32 of the statistics of play, and whether the play at any table exhibits trends which could give a card counter an advantage. If desired, a second CRT terminal 34 could also be installed in the "pit" in which the tables are located, as could a display of the history of play, as at 36. Each card and bet recognition unit 24 would be adapted to give an alarm as at 38, which would be energized in the event of a dealer error, or the like.

Figure 3:
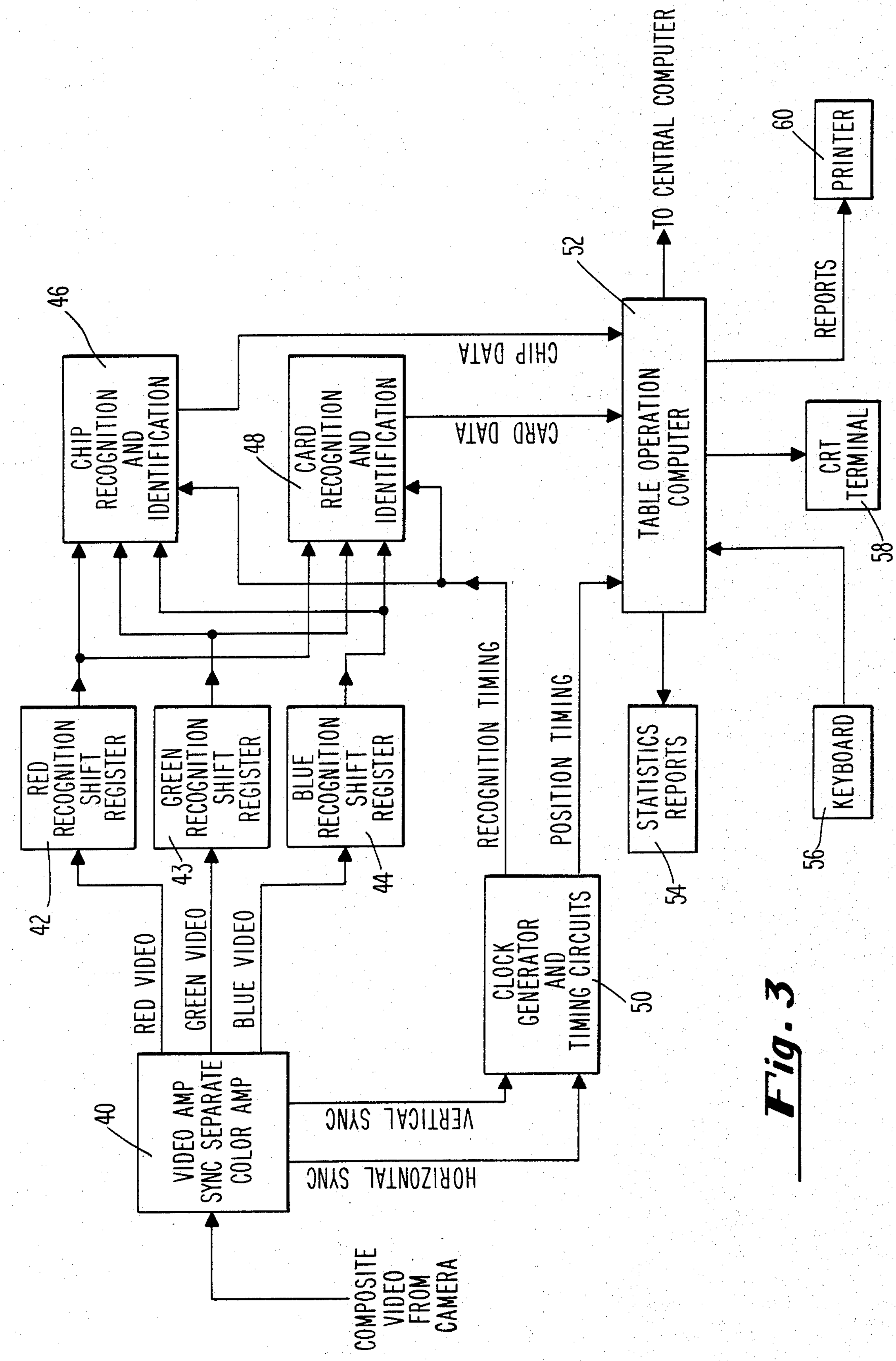
FIG. 3 shows a detailed version of a portion of the system shown in FIG. 2.

FIG. 3 shows details of the individual card and bet recognition units 24 shown in FIG. 2. The mechanical and electrical units which identify the cards and chips are effectively modifications of presently available scanners. For example, scanners now used in optical character recognition apparatus for inputting of typewritten material to a word processor or other computing equipment are available, which application is far more demanding than chip and card recognition. Typically, a video camera supplies the composite video signal to a video amplifier, synchronization pulse separator and color separation unit 40. This outputs the separate red, green and blue video signals to recognition and shift registers 42, 43, 44. These are used by chip recognition unit 46 and card recognition unit 48 to identify the cards dealt and the chips bet. The horizontal and vertical sync pulses are passed to a clock generator and a timing circuit unit 50 to keep the operation synchronized. Preferably, the scanning operations are repeated at the standard frequency of 30 Hz. Chip recognition is done typically on the basis of the color of the chip, in accordance with the usual practice according to which chips of different colors represent different bet amounts. Card location is actually simpler than many present scanning operations, inasmuch as the cards are highly contrastive, being white on a green felt table. Similarly, analysis of the video image to determine the value of the cards is straightforward. The corners of the cards may be disregarded and the number of pips, i.e., the symbols indicating the suit of the cards (which is irrelevant in blackjack) in the center of the card may be counted to identify the card. Further simplifying the matter is the fact that in blackjack all face cards are equally valued with the 10 card, so that the jack, queen and king cards need not be distinguished from one another by the system of the invention, although this is entirely within the capability of today's scanner technology.

The card and chip data thus generated is passed to a table operation computer 52, one per table, which may in a preferred embodiment be a single chip microprocessor, for example, the Motorola 68000 unit. This microprocessor can be controlled in a known manner to generate reports as required. It may also receive operator inputs from a keyboard, provide a continuous display on the CRT terminal 58 and generate reports via a printer 60. Alternatively, the table data may be sent to a central computer as indicated, if it is desired that the reports be generated thereby as in the system shown in FIG. 2.

By having knowledge of the cards dealt and the chips bet by each player, the table computer 52 is able to calculate precisely the result of each hand played per deal. Since the casino invariably will have a rule governing the play of the dealer, there is no question of his response to any sequence of bets or cards dealt, so that the outcome of all bets may be calculated by observation of the chips played and of the cards dealt. For example, sometimes it is permitted that a player may double his bet after his cards have been dealt, for example, if he is dealt a pair of cards having the same value. The chip recognition unit 46 will inform the table computer 52 that the bet has been doubled and the outcome of the play will be varied accordingly.

Figure 4:
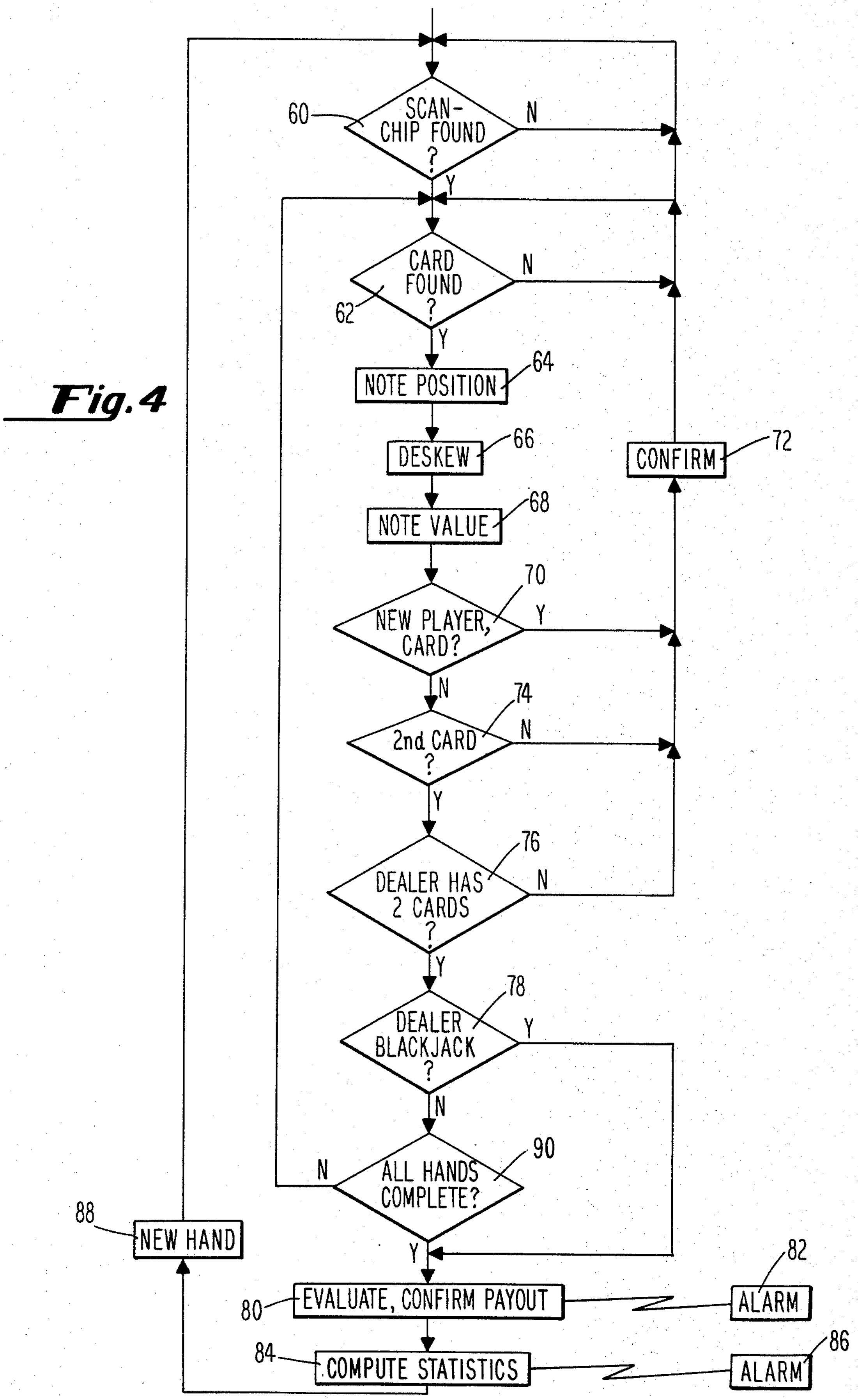
FIG. 4 shows a schematic flowchart of the calculations made by the processing unit.

FIG. 4 shows a functional flowchart of the sequence of computations undergone during the play of each hand. At 60 is indicated the basic scanning operation which is repeated until a chip is found indicating that a player is in the game. At 62 the scanner looks for a card.

This is simply detected by noting the contrast of the white playing card against the green surface. The position of the card is noted as at 64 and correlated with the player number, so that the bet made by that player and the cards dealt him are correlated. The cards will typically not be dealt at right angles to the direction of scanning of the video camera; they may be computationally deskewed at 66 if desired. However, since the scanning operation is relatively simple, counting of the pips only being required, deskewing may not be required, depending on the particular scanning unit employed. The value of the card is noted at 68 and it is compared with previously stored values of the card for that position, if any at 70. In this way, the program is assured that it has the correct chip and card value at all times with respect to each player. It is possible that despite casino rules prohibiting the player from touching the cards, they could temporarily be obscured from the camera's view and the like, and accordingly it is desirable to frequently refresh the input with respect to the bets made and the cards dealt, e.g., at the usual 30 Hz of video camera scan rate operation. If all players have been dealt their second cards, as at 74, and if the dealer has his, as at 76, whether or not the dealer has blackjack, i.e., an unbeatable hand, is considered at 78. If he does, evaluation of the outcome of the hands and confirmation of the correct payout, i.e., to check that the dealer is either collecting or paying out the proper amounts to the players proceeds immediately at 80. If the dealer does not have blackjack, and all the hands are not complete, as at 90, the scanner continues to look for additional cards until this test is satisfied. Thereafter, the relative winning and losing of each player and the payouts made can be checked at 80. If there is an error an alarm is raised as indicated at 82. After all payouts have been checked, the statistics, i.e., determination of whether or not conditions favoring card counters exist, are computed at 84 and an alarm is raised at 86 if such conditions do exist. After all this is done, the hand has effectively been completed and a new hand may be initiated as indicated at 88.

It will be appreciated that while there has been described exemplary hardward and software methods for implementing the system of the invention, numerous alternatives are available in today's highly sophisticated computer marketplace and that many different implementations and design features could be incorporated into the system of the invention without departing from the essential principles thereof. It will furthermore be recognized that the system described generally could have applicability to monitoring games of chance other than blackjack and indeed games not even involving cards. It would not be unthinkable, though perhaps overly complex to be economically desirable at the time of filing of this application, to monitor such complex games as craps, roulette and other games involving numerous intricate betting sequences and game rules. It will be appreciated that in all of these games it is highly desirable that a highly accurate apparatus for determining whether the play is being conducted according to the rules of the game and of the casino be provided. Accordingly, the above disclosure of the invention is to be considered as exemplary only and the scope of the invention is not to be limited thereby, but only by the following claims.

I claim:

1. A system for monitoring the play of a gambling game of chance, the outcome of which depends on the outcome of a random physical occurrence, comprising:

means for determining the bets placed by each player;

means for optically monitoring the outcome of said random occurrence;

means for determining whether each player has won or lost his bet at the termination of each round of play;

means for determining whether each player's bet has either been correctly paid out or collected from him;

means for determining whether conditions exist which would tend to alter the odds ordinarily applicable to the game being played; and means for generating an alarm signal in the event that an error is made in the play, such that the rules of the game are broken, or that such conditions exist;

wherein said means for determining the bets placed and said means for optically monitoring comprise means for analyzing an optical image formed by a video camera and for generating a numeric representation thereof.

2. The system of claim 1 further comprising means for examining the play of cards, where the game being played is a card game, and means for recognizing the values of cards dealt to players and correlating those values with individual players.

3. The system of claim 2 wherein said system correlates said players and the cards dealt to them by examining specific areas assigned to each player at his card location on a playing table.

4. The system of claim 1 wherein said means for determining the result of each player's bet and for generating an alarm signal comprises digital computer means.

5. A system for monitoring the play of a blackjack game comprising:

optical scanner means for generating a digital representation of the bets made by players and of the cards dealt to them and to the dealer; and digital computer means for storing the output of said optical scanner means, for calculating the proper result of each hand played and for generating an alarm when an error is made in the play of the hands, said computer means further being adapted to output an alarm signal when the play of a sequence of hands indicates that a statistical imbalance exists in the values of the cards having been played, so as to alter the odds ordinarily applicable to the game.

6. The system of claim 5 wherein said system recognizes bets made by players and cards dealt to them by assigning individual areas on the playing table to individual ones of said players.

7. The system of claim 5 wherein plural computers each monitoring play at a single table are adapted to have their outputs summed so as to enable generation of a report summing over plural ones of said playing tables.

8. Method for monitoring the play at gambling games, the outcome of which depends on one or more random physical events, comprising the steps of:

detecting the bet made by each player with video camera means and associating it with that player;

optically detecting the occurrence of said one or more random physical events with video camera means;

generating digital signals corresponding to said bets and the occurrence of said random physical events as detected by said video camera means;

at the conclusion of each round of play, calculating the outcome of each player's bet responsive to said signals;

determining whether the payout to the players and the collection of their bets is made by a dealer in accordance with the rules of the game; and generating an alarm if said determination indicates that said rules have been violated.

9. The method of claim 8, comprising the additional step of retaining the outcome of plural rounds of play at a particular table, and generating an alarm if said outcome indicates that the odds ordinarily applicable to the game have varied.

* * * * *